Patented June 22, 1943

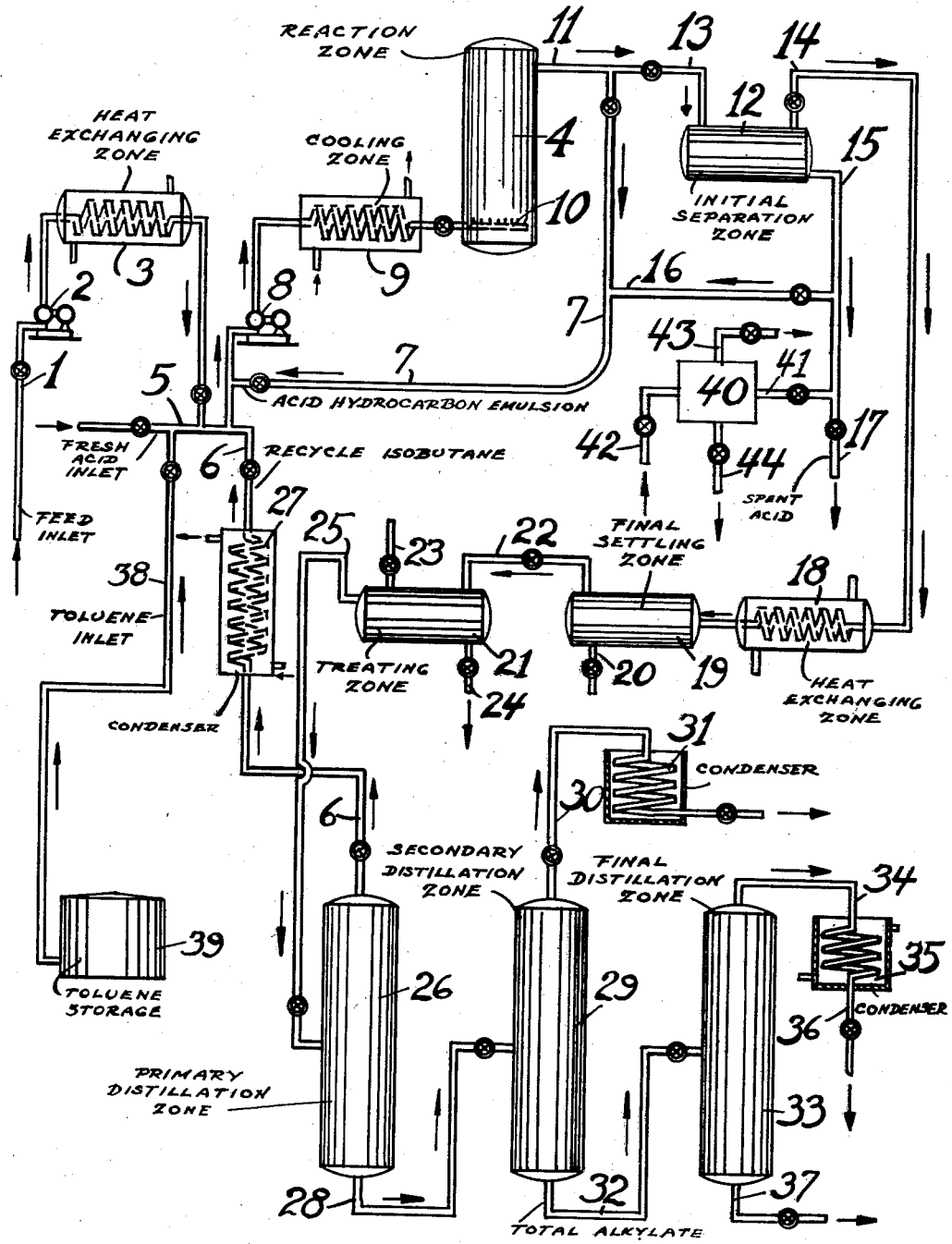

2,322,664

UNITED STATES PATENT OFFICE 2,322,664

PRODUCTION OF MOTOR FUELS

Robert P. Russell, Short Hills, N. J., assignor to Standard Oil Development Company, a corporation of Delaware Application June 27, 1941, Serial No. 399,965

8 Claims. (Cl. 260—683.4)

The present invention is concerned with the production of normally liquid saturated hydrocarbons suitable for use as motor fuels by a process which involves the condensation of isoparaffinic hydrocarbons with olefin hydrocarbons in the presence of a suitable catalyst. In accordance with the present invention, the condensation reaction is carried out by employing a mineral acid catalyst in the presence of an aromatic hydrocarbon.

It is known in the art that saturated hydrocarbons containing a tertiary carbon atom, hereinafter referred to as tertiary hydrocarbons, will react with olefins in the presence of a suitable catalyst such as a concentrated mineral acid, resulting in the production of a wide range of higher boiling hydrocarbon products. The nature of these reactions varies widely with the reaction conditions and with the particular type and character of feed materials and catalyst employed. The feed stocks employed in reactions of this character vary considerably. The tertiary hydrocarbon constituents of the feed stock usually comprise isobutane, isopentane, and similar higher branched chain homologues containing at least one tertiary carbon atom per molecule. The olefinic reactants generally comprise propylene, normal butylenes, isobutylene, trimethyl ethylene, the isomeric pentenes and similar higher mono-olefinic hydrocarbons of either a straight chain or branched chain structure. Mixtures of two or more of these mono-olefins are likewise employed. Operations are conducted in which the feed material comprises particular refinery cuts segregated from various cracking and distillation operations, such as propane, butane and pentane cuts which comprise constituents boiling in the respective boiling ranges. Other feed materials comprise various polymers, copolymers, interpolymers, and crosspolymers of the above-mentioned olefins, such products being, for example, diisobutylene, triisobutylene, tetraisobutylen, the codimer, cotrimer and cotetramer of normal butylenes and isobutylene, the interdimer, intertrimer and intertetramer of isobutylene with pentenes.

The catalyst generally employed comprises a concentrated mineral acid as, for example, a sulfuric acid, a halogenated sulfuric acid, an acid of phosphorus or an equivalent acid. Other catalysts utilized are boron fluoride, the metal halides, such as aluminum halide and iron halide, acid activated clays, as well as the mineral acids, employed in conjunction with various compounds of the fifth group of the periodic system, the aluminum halide-alkali metal halide double salt complexes, and various other similar catalysts. When a mineral acid is utilized as the catalyst the acid concentration is above about 80%, preferably in the range from about 90% to about 95%. Although a wide range of operating temperatures are employed the reaction is usually conducted at a relatively low temperature, that is, of the order of about 30° F. to about 100° F., preferably between about 40° F. and about 70° F. The time of the reaction varies considerably but in general is in the range from about 5 minutes to about 2½ hours, or longer, depending upon related operating conditions. Usually the reaction time is in the range from about 10 to about 60 minutes.

The reaction may be carried out in the vapor phase but is generally conducted in the liquid phase. In a liquid phase operation the pressures are at least sufficient to keep the respective reactants from vaporizing and are usually in the range from about 0 to about 12 atmospheres, although pressures as high as 100 atmospheres may be employed depending upon the reaction temperature.

In these reactions equal molecular quantities of the isoparaffin and mono-olefin may be used. However, it has been found that it is desirable to maintain a substantial excess of the tertiary hydrocarbon in the reaction zone and to operate in a reaction medium containing an excess of the catalyst composition. For example, in an operation wherein isobutane or isopentane is employed as the isoparaffinic reactant, the mol ratio ranges from about 1 to as high as 30 mols and higher of isoparaffin per mol of mono-olefins present.

Although as pointed out heretofore various catalysts may be employed in operations of this character, a preferred catalyst comprises concentrated sulfuric acid having a concentration in the range from about 90% to about 110%. However, there are certain disadvantages inherent in its use. Sulfuric acid is an oxidizing agent and under the conditions employed in the reaction it is practically impossible to eliminate this oxidizing effect completely. Thus various side reactions occur and the catalyst is degraded at a relatively rapid rate, resulting in decreased yields and high acid consumption. I have, however, now discovered that providing an aromatic hydrocarbon as, for example, toluene be employed in conjunction with the sulfuric acid, the oxidizing effect is minimized and results in increased yields and lower acid consumption. In accordance with the preferred modification of my invention the aromatic hydrocarbon is added to the acid before the acid contacts the reaction constituents. The process of my invention may be readily understood by reference to the attached drawing illustrating one embodiment of the same.

Referring specifically to the drawing, it is assumed for the purpose of illustration that the feed comprises a refinery butane cut comprising butane, isobutane, isobutylene, alpha butylene, and beta butylene. The feed is introduced into the system by means of feed line 1, pump 2 and passed through heat exchanging zone 3 wherein the temperature of the feed is lowered to the desired degree. The feed is combined with fresh acid, with recycled acid hydrocarbon emulsion, and with recycled isobutane, which latter streams are produced as hereinafter described. The fresh acid is introduced by means of acid feed line 5, the recycled isobutane by means of line 6 and the recycled acid hydrocarbon emulsion by means of line 7. For the purpose of description, it is assumed that the fresh acid comprises sulfuric acid of about 90% to about 95% concentration. The mixture is passed by means of pump 8 through cooling zone 9 and introduced into reaction zone 4 by suitable jets or equivalent dispersing means 10. Turbo mixers, orifice mixers, or mechanical agitators may be employed. Cooling zone 9 preferably comprises a propane cooler or other equivalent means which is regulated to control the temperature of the mixture entering reaction zone 4. Usually the temperature of the mixture entering reaction zone 4 is in the range from about 15° F. to about 125° F., preferably at a temperature in the range from about 35° F. to about 70° F. In general, the lower the temperature of alkylation the lower will be the acid consumption.

The reaction mixture flows upwardly through reaction zone 4 which may contain suitable dispersing and distributing means as, for example, pierced plates, baffle plate arrangements, pack masses, or other equivalent means. Conditions are adjusted so as to secure the desired reaction time in reaction zone 4. The reaction mixture is withdrawn from reaction zone 4 by means of line 11 and segregated into two streams.

One stream is recycled to the reaction zone by means of line 7 while the other stream is passed to initial separation zone 12 by means of line 13. The manner in which the stream withdrawn from reaction zone 4 is segregated may vary considerably. However, for the purpose of description it is assumed that approximately 2% to 25% of the stream removed from reaction zone 4 is passed into initial separation zone 12. Temperature and pressure conditions in zone 12 are adjusted to secure the formation of a hydrocarbon phase which is removed from zone 12 by means of line 14 and an acid phase which is removed by means of line 15. A portion of the acid withdrawn from line 15 is recycled to zone 4 along with the acid hydrocarbon emulsion by means of line 16 while the remainder is withdrawn from the system as spent acid by means of line 17. The amount of acid withdrawn will vary considerably depending upon the related operating conditions. However, for the purpose of description it is assumed that sufficient acid is added to the acid hydrocarbon emulsion by means of lines 5 and 16 so as to maintain a ratio of acid to hydrocarbon of approximately 1 to 1. The hydrocarbon phase comprising normal butane, isobutane, and total alkylate withdrawn from settler 12 by means of line 14 is passed through heat exchanging zone 18 and introduced into a final separation zone 19 wherein any entrained acid is separated and removed by means of line 20. The hydrocarbon layer is passed into alkaline washing zone 21 by means of line 22 wherein the same is contacted with a suitable alkaline reagent which is introduced by means of line 23 and withdrawn by means of line 24. For the purpose of description it is assumed that the alkaline reagent comprises a sodium hydroxide solution. The soda washed hydrocarbon phase is withdrawn from treating zone 21 by means of line 25 and introduced into an initial distillation zone 26, which for the purpose of description is termed an isobutane tower. Temperature and pressure conditions are adjusted in zone 26 to remove isobutane overhead by means of line 6, which stream is condensed in condensing zone 27 and recycled with the feed to reaction zone 4 as hereinbefore described. The bottoms stream withdrawn from zone 26 by means of line 28 comprising normal butane and total alkylate is introduced into a secondary distillation zone 29, which for the purpose of description is termed a normal butane tower. Temperature and pressure conditions are adjusted to remove normal butane overhead by means of line 30, which stream is condensed in condensing zone 31 and further refined or handled as desired. In general, this stream is passed to motor fuel blending. The bottoms from secondary distillation zone 29 withdrawn by means of line 32 comprising the total alkylate is passed to a final distillation zone 33 wherein the same is fractionated to secure the desired product. Temperature and pressure conditions are adjusted in zone 33 to remove overhead by means of line 34 a hydrocarbon product having a final boiling point of about 290° F. to about 320° F. and an octane number in the range from about 90 to about 95. This overhead stream is condensed in condensing zone 35 and withdrawn from the system by means of line 36. The bottoms product withdrawn by means of line 37 comprises a fuel boiling in the range from about 320° F. to 500° F. and has an octane number in the range from about 75 to 85. This material is further refined or handled in any manner desired.

My invention as adapted to the above described operation is to employ in conjunction with the acid an aromatic hydrocarbon. When operating in this manner, the amount of acid degraded and utilized is appreciably less. For the purpose of description, it is assumed that the aromatic hydrocarbon comprises toluene and that the same is withdrawn from toluene storage 39 and introduced into the fresh acid by means of line 38. The toluene may be recovered from the spent acid by passing the spent acid to toluene recovery zone 40 by means of line 41 wherein the same is treated preferably with steam which is introduced by means of line 42. The toluene is removed by means of line 43 and recycled to toluene storage 39 while the spent acid is removed by means of line 44.

The process of the present invention may be widely varied. It is to be understood that the respective zones may comprise any suitable number and arrangement of units. The invention is not limited to the use of any particular feed stock. Any hydrocarbon mixture comprising paraffinic constituents containing at least one tertiary carbon atom may be employed. However, it is preferred to use as a feed isoparaffinic hydrocarbons which are present in refinery butane, propane, and pentane cuts comprising hydrocarbon constituents boiling in the respective ranges. The olefin reacted may comprise any constituent containing at least one double bond. However, the preferred olefin constituents comprise relatively low boiling hydrocarbons such as normally gaseous hydrocarbons or polymers of the same. The preferred feed fraction comprises iso and normal butanes which are present in a refinery butane cut. For example, a refinery butane cut which contains about 10% to 20% of C₄ olefins, about 30% of isobutane, and about 50% to 60% of normal butane is a very desirable feed stock.

It is desirable to maintain a relatively large molecular excess of isoparaffins, such as 10 to 100 or higher mols of isoparaffins per mol of olefin. This is preferably secured by recycling a large excess of the isoparaffins. As pointed out heretofore, the temperatures and pressures may vary considerably. The temperature of the reaction may be as low as $-20°$ F. or as high as about $100°$ F. and more. However, in general it is preferred to conduct the reaction in the range from about 0 to $70°$ F., and to maintain the entire system under pressure so as to maintain the reactants in liquid condition. The preferred pressures are in the range from about 100 to about 250 pounds per square inch, but pressures in the range from about 18 to 3000 pounds per square inch may be employed depending upon the particular catalyst utilized and the temperature employed.

The hydrocarbon product removed from the final settling zone is treated with any suitable alkali. However, this hydrocarbon fraction is generally treated with a 2% aqueous solution of sodium hydroxide. This concentration of alkali effectively removes all traces of the acid catalyst and prevents any subsequent corrosion of the refining and distillation equipment.

The alkylated hydrocarbon product is handled in the respective distillation zones in a manner to segregate the isobutane, the normal butane, and to fractionate the total alkylated product. Temperatures and pressures maintained in the respective zones will vary depending upon the character of the feed oil. For example, when the total feed fraction to the alkylation unit comprises a butane cut and it is desired to segregate a hydrocarbon product having a final boiling point in the range from about $290°$ F. to $310°$ F., the hydrocarbon fraction introduced into the isobutane tower is flashed under a pressure of about 75 pounds per square inch. The temperature maintained at the top of the tower is in the range from about $100°$ F. to $130°$ F. while the temperature at the bottom is in the range from about $150°$ F. to $200°$ F. The temperature at the top of the normal butane tower is in the range from about $100°$ F. to $130°$ F., while the bottoms temperature is in the range from about $280°$ F. to $330°$ F. The normal butane tower is maintained at about 50 pounds gauge pressure. The pressure on the rerun tower is about atmospheric while the vapor line temperature is in the range from about $200°$ F. to $280°$ F., and the bottoms temperature is in the range from about $300°$ F. to $350°$ F.

The invention essentially comprises employing an aromatic hydrocarbon in conjunction with the acid utilized as the catalyst in an alkylation reaction. Although the aromatic hydrocarbon may comprise benzene, xylenes, and low boiling aromatic extracts from petroleum oils, I have found that a particularly desirable aromatic hydrocarbon comprises toluene. The amount of aromatic hydrocarbon employed in conjunction with the acid may vary considerably, but is in the general range from about 2% to 20%, based upon the acid. For example, when employing toluene in conjunction with 90% to 96% concentrated sulfuric acid, it is preferred to use from about 2% to about 8% toluene, based upon the acid. Although under certain conditions the toluene may be added with the feed hydrocarbon mixture, I have found that it is desirable to add the toluene to the acid before contacting the feed material with the acid. By operating in this manner, alkylation of the toluene is prevented.

The aromatic hydrocarbon is withdrawn in solution in the spent acid and may be recovered by heating the acid and steam distilling. If the aromatic hydrocarbon comprises toluene, the spent acid is heated to a temperature of about $200°$ F. to about $300°$ F. and steam distilled.

In order to illustrate the invention further the following examples are given which should not be construed as limiting the same in any manner whatsoever:

*Example 1*

In a series of alkylation operations conducted under similar conditions utilizing the same feed oil, with the exception that the amount of toluene utilized was varied, the following results were secured:

| Operation | Toluene percent based upon sulfuric acid | Sulfuric acid consumption (using operation A as 100%) |
|---|---|---|
|  |  | *Percent* |
| A | None | 100 |
| B | 5 | 40 |
| C | 20 | 36 |

From the above, it is apparent that the acid consumption is materially reduced by the utilization of toluene in conjunction with the acid. It is also apparent that the 5% toluene was substantially equally effective as compared to the 20% toluene.

*Example 2*

In another series of operations conducted under identical conditions, 20% toluene was added in one operation to the acid while in the second operation the toluene was added to the feed. In the operation in which the toluene was added to the feed, it was found that some alkylation of the toluene occurred which was not the case when the toluene was added to the acid.

The results secured in these operations were as follows:

|  | Operation | |
|---|---|---|
|  | D | E |
|  | Toluene added to acid prior to olefin addition | Toluene mixed with olefin prior to alkylation |
| Vol. % toluene based on acid | 20 | 20 |
| Operating conditions: |  |  |
| Temperature °F | 68 | 68 |
| Isobutane-butylene ratio | 10.8 | 10.8 |
| Acid-butylene ratio | 7.5 | 7.5 |
| Time of olefin addition minutes | 90 | 90 |
| Time of stirring after addition do | 30 | 30 |
| Vol. % yield based on olefins: Butane-free product | 155.0 | 89.3 |
| Composition of product: |  |  |
| Lighter than octanes per cent | 12.9 | 0 |
| Octanes do | 75.0 | 16.6 |
| Heavier than octanes do | 12.1 | 83.4 |
| A. S. T. M. octane No., octanes fraction | 91.2 | (¹) |

¹ Engine would not fire.

I claim:

1. In the alkylation of isoparaffin with monoolefin under alkylation reaction conditions in the presence of a mineral acid catalyst of alkylating strength, the improvement comprising admixing an aromatic hydrocarbon with the said acid prior to catalyzing the alkylation reaction with said acid.

2. A process as defined in claim 1 in which the said aromatic hydrocarbon is selected from the class consisting of benzene, toluene, xylenes and low boiling aromatic extracts from petroleum oils.

3. A process as defined in claim 1 in which between about 2% and about 20% of the aromatic hydrocarbon based on the acid is employed.

4. A process as defined in claim 1 in which the said mineral acid comprises essentially concentrated sulfuric acid and in which the aromatic hydrocarbon comprises between about 2% and about 8% of toluene based on the said sulfuric acid.

5. An improved aliphatic alkylation process which comprises intimately contacting in the liquid phase isoparaffin and at least one normally gaseous monoolefin under aliphatic alkylation reaction conditions in the presence of concentrated sulfuric acid of alkylating strength containing at least one aryl hydrocarbon of the benzene series, said aryl hydrocarbon having been added to said acid prior to contacting said acid with the isoparaffin and olefin.

6. A process as defined in claim 5 in which the said aryl hydrocarbon is selected from the class consisting of benzene, toluene, xylenes and low boiling aromatic extracts from petroleum oils.

7. A process as defined in claim 5 in which between about 2% and about 20% of the said aryl hydrocarbon based on the acid is employed.

8. A process as defined in claim 5 in which the acid is of a strength between about 90% and about 110% and in which the aryl hydrocarbon is toluene added in an amount between about 2% and about 8% based on the acid.

ROBERT P. RUSSELL.